Figure 1:
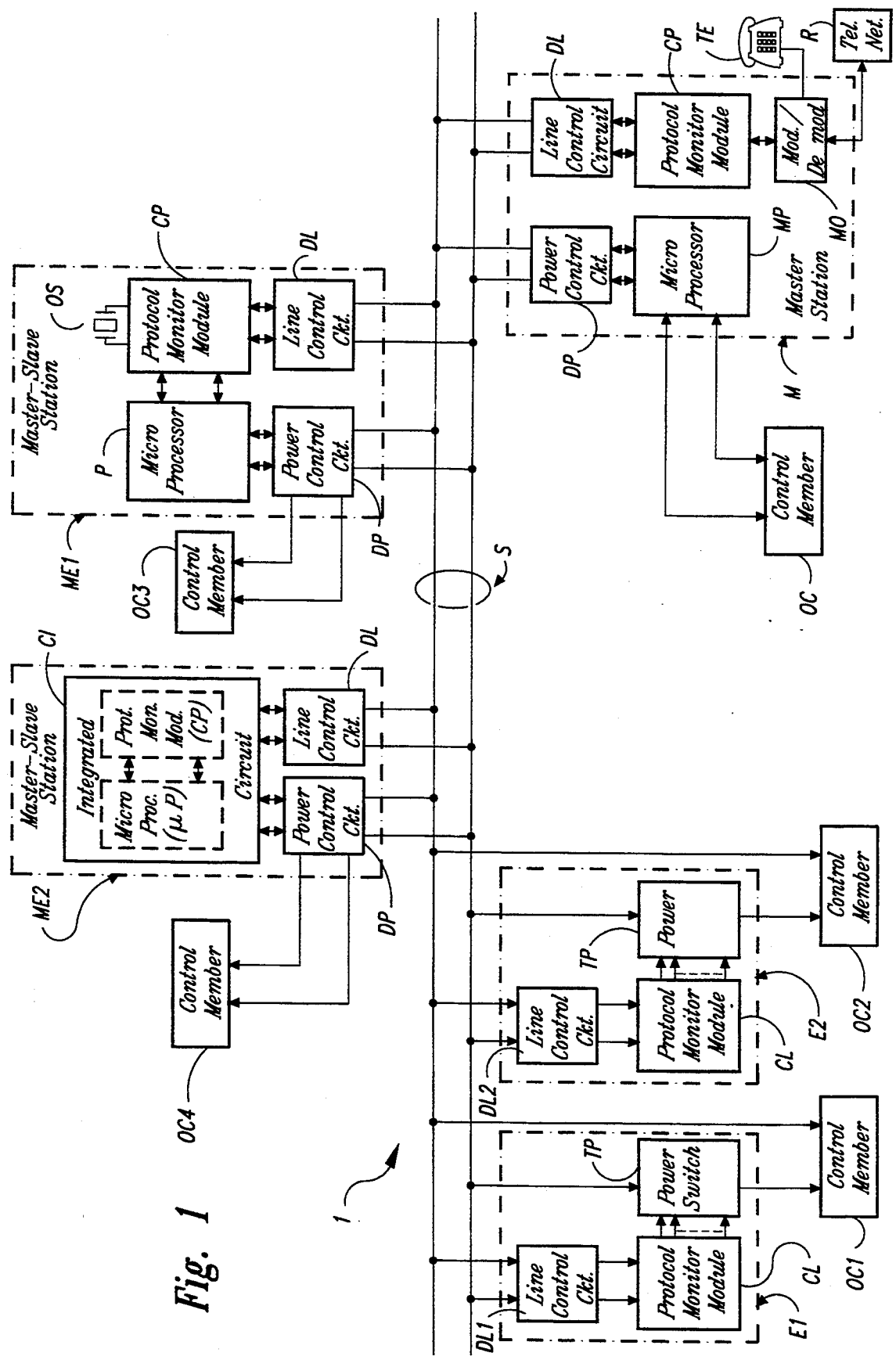

United States Patent [19]

Le Van Suu

[11] Patent Number: 5,410,292
[45] Date of Patent: Apr. 25, 1995

[54] METHOD AND SYSTEM FOR COMMUNICATING INFORMATION WITHIN A DWELLING OR A PROPERTY

[75] Inventor: Maurice Le Van Suu, Ramainville, France

[73] Assignee: SGS-Thomson Microelectronics S.A., Gentilly, France

[21] Appl. No.: 903,530

[22] Filed: Jun. 24, 1992

[30] Foreign Application Priority Data

Jun. 24, 1991 [FR] France ................... 91 07738

[51] Int. Cl.$^6$ ............................................. H04B 3/00
[52] U.S. Cl. ......................... 340/310.06; 340/825.54; 340/825.08; 370/85.8; 370/259
[58] Field of Search ........ 340/310 R, 310 A, 310 CP, 340/825.06, 825.54, 825.14; 370/79, 84; 375/7, 8, 37

[56] References Cited

U.S. PATENT DOCUMENTS

| | | | |
|---|---|---|---|
| 3,973,087 | 8/1976 | Fong | 340/310 R |
| 4,580,276 | 4/1986 | Andruzzi, Jr. et al. | 340/310 R |
| 4,737,967 | 4/1988 | Cahalan | 340/310 A |
| 4,756,007 | 7/1988 | Qureshi et al. | 375/37 |
| 4,882,727 | 11/1989 | Williams et al. | 370/79 |
| 4,916,642 | 4/1990 | Kaiser et al. | 340/310 R |
| 4,965,796 | 10/1990 | Petty | 370/84 |
| 5,008,879 | 4/1991 | Fischer et al. | 370/84 |
| 5,021,777 | 6/1991 | Gross et al. | 340/310 R |
| 5,033,112 | 7/1991 | Bowling et al. | 340/310 CP |
| 5,051,720 | 9/1991 | Kittiratsunetorn | 340/310 R |
| 5,058,163 | 10/1991 | Lubarsky et al. | 370/84 |
| 5,101,191 | 3/1992 | MacFadyen et al. | 340/310 A |

FOREIGN PATENT DOCUMENTS

0174804 9/1985 European Pat. Off. .
0225340 11/1986 WIPO .

OTHER PUBLICATIONS

8079 Mini-Micro Conference Record, May 1984 "Super Serial Systems" by Ronald L. Mitchell.
8087 IEEE Transactions on Consumer Electronics, Aug. 1986 "Housekeeping Application with Bus Line and Telecommunication" by Toshiba Corporation, Tokyo, Japan.

Primary Examiner—Donnie L. Crosland
Attorney, Agent, or Firm—Seed & Berry

[57] ABSTRACT

A method for communicating information and commands within a dwelling or a property between several items of electrical equipment connected to an electrical distribution circuit equipping the dwelling, by injecting onto said distribution circuit carrier currents conveying said information and commands. The method comprises a hierarchized communication protocol between, on the one hand, items of equipment defining communication stations of Master type dedicated to the emission of information, and, on the other hand, items of equipment defining communication stations of Master-Slave type dedicated to the reception of information arising from the stations of Master type and to the emission of information intended for sets of equipment defining stations of Slave type dedicated to the reception of information and commands arising from one or more of the said stations of Master-Slave type, and to the emission of information on their condition.

13 Claims, 4 Drawing Sheets

METHOD AND SYSTEM FOR COMMUNICATING INFORMATION WITHIN A DWELLING OR A PROPERTY

The present invention relates to a method for communicating information and commands within a dwelling or a property. It is also aimed at a system for implementation thereof and application thereof to an installation for automated management of a home installation.

Property is understood to mean any construction or set of constructions intended to contain apartments and/or premises for commercial or business use.

The considerable development of automation schemes for accommodation and more generally in the area of home systems has led designers of these schemes to raise the problem of the communication of information and commands between the various components of a home installation.

Several concepts for bus communication have already been advanced, in particular the BATI BUS and EIBUS concepts which employ a twisted pair of wires as transmission channel to convey information from one point to another.

This type of bus requires the installation of special cables to effect interconnections between several items of equipment, this giving rise to significant infrastructure costs once a number of installations are envisaged or one or more items of equipment are to be moved within the home system. These buses are aimed essentially at new integrated properties dedicated mainly to tertiary activities.

There also exist methods of communicating information and commands by carrier currents employing an injection of information onto the single-phase or three-phase mains network of a dwelling by modulation techniques well known and widely disclosed. The application may be cited of carrier currents for Electricité de France remote control relays employing two distinct modulating frequencies (175/188 Hz).

More recently, the requirement to put in place a standard for communication by carrier currents within accommodation has led to defining the type of modulation, the speed of transmission and the spectral occupancy of such a communication and to proposing an associated protocol specifying a frame structure injected onto a home electrical network onto which is branched a set of equipment constituting as many communication stations. Frame is understood to mean a string of binary elements or bits representing a coherent set of coded information items.

Thus, a presently proposed frame structure includes:
- a (16 bit) preamble for synchronizing the stations,
- a (16 bit) header preceding all useful information,
- a (28 bit) address preceding all monitoring information,
- the alternating with data of a transmission monitoring code of CRC type.

Such a protocol, although it does indeed permit a transmission of digital information on the mains equipping an apartment, has the disadvantage however of being relatively complex and too general when considering overall the set of all the items of equipment relevant to a communication within the accommodation.

This ultimately results in difficulties of implementation and practical management of the communications between items of equipment of substantially differing nature within the same network.

In particular, such a protocol does not at this juncture make it possible to envisage speeds of transmission which differ according to the type of equipment, this necessarily leading to the use of an information throughput dictated by the slowest equivalent and thus to performance ratings which may be mediocre having regard to the cost of the communication system.

The purpose of the present invention is to remedy these disadvantages by proposing a method for communicating information and commands within a dwelling between several items of electrical equipment connected to a mains electrical distribution circuit equipping this dwelling, by injecting onto the distribution circuit carrier currents conveying said information and commands.

According to the invention, the method comprises a hierarchized communication protocol between on the one hand, items of equipment defining communication stations of Master type dedicated to the emission of information, and on the other hand, items of equipment defining communication stations of Master-Slave type dedicated to the reception of information arising from the stations of Master type and to the emission of information intended for sets of equipment defining stations of Slave type dedicated to the reception of commands or orders arising from one or more of the said stations of Master-Slave type, and this communication protocol defines, for each state of communication between stations of like or unlike types, transmission parameters, in particular a digital transmission speed, which are determined as a function of said stations.

Thus, with the method according to the invention, the items of electrical equipment are organized in such a way that an overall communication strategy leads to an optimization of the flow of information exchanged. Indeed, instead of allocating an equivalent status to the set of equipment and of defining a uniform digital transmission speed, physical layers of differing hierarchies are put in place and within each layer specific transmission parameters are provided. It is thus a matter of taking into account the individual characteristics of certain families of electrical equipment, in particular in terms of digital transmission speed, and of offering each item of equipment the possibility of developing a strategy individual to its family of products intended to be controlled in a home installation, the "bridgehead" of its product family possibly consisting of one or more Master-Slave stations.

According to a preferred version of the invention, the hierarchized communication protocol authorizes exchanges of information between one at least of said stations of Master type and items of equipment outside the dwelling, via a communication medium, it being possible for these exchanges to be performed according to an external communication protocol which is unlike the hierarchized communication protocol.

This characteristic enables a home installation to communicate with the outside by employing a protocol for external communication between several dwelling units and between a dwelling and an arbitrary communications network; this type of communication necessarily travels via a station of Master type, thus overseeing the flow of information and effectively redistributing the information intended for each family of equipment.

According to an advantageous embodiment of the invention, the information is transmitted within the context of the hierarchized communication protocol, in the form of a frame containing a set of fields each constituted by a coded sequence comprising a predetermined number of bits, one of the said fields being an identification field including the following information:

- address of the dwelling
- address of the station aimed at within the dwelling, and
- type of the station.

The identification field proposed by the invention permits a wide variety of modes of selecting stations of relevance to given information. In particular, through known masking techniques, it is possible to direct an item of control information towards a group of Slave stations very simply.

According to another aspect of the invention, the system for communicating information and commands within a dwelling, employing the method according to the invention, comprises:

- within a first group of equipment, communication stations of Master type configured to generate and emit information and commands on the electrical distribution circuit,
- within a second group of equipment, communication stations of Master-Slave type configured to receive and execute commands originating from the stations of Master type and to generate and emit on the electrical distribution circuit commands intended for:
- a third group of equipment including communication stations of Slave type dedicated to the reception and execution of commands arising from stations of Master-Slave type, and to the emission of information on their condition.

Figure 2:
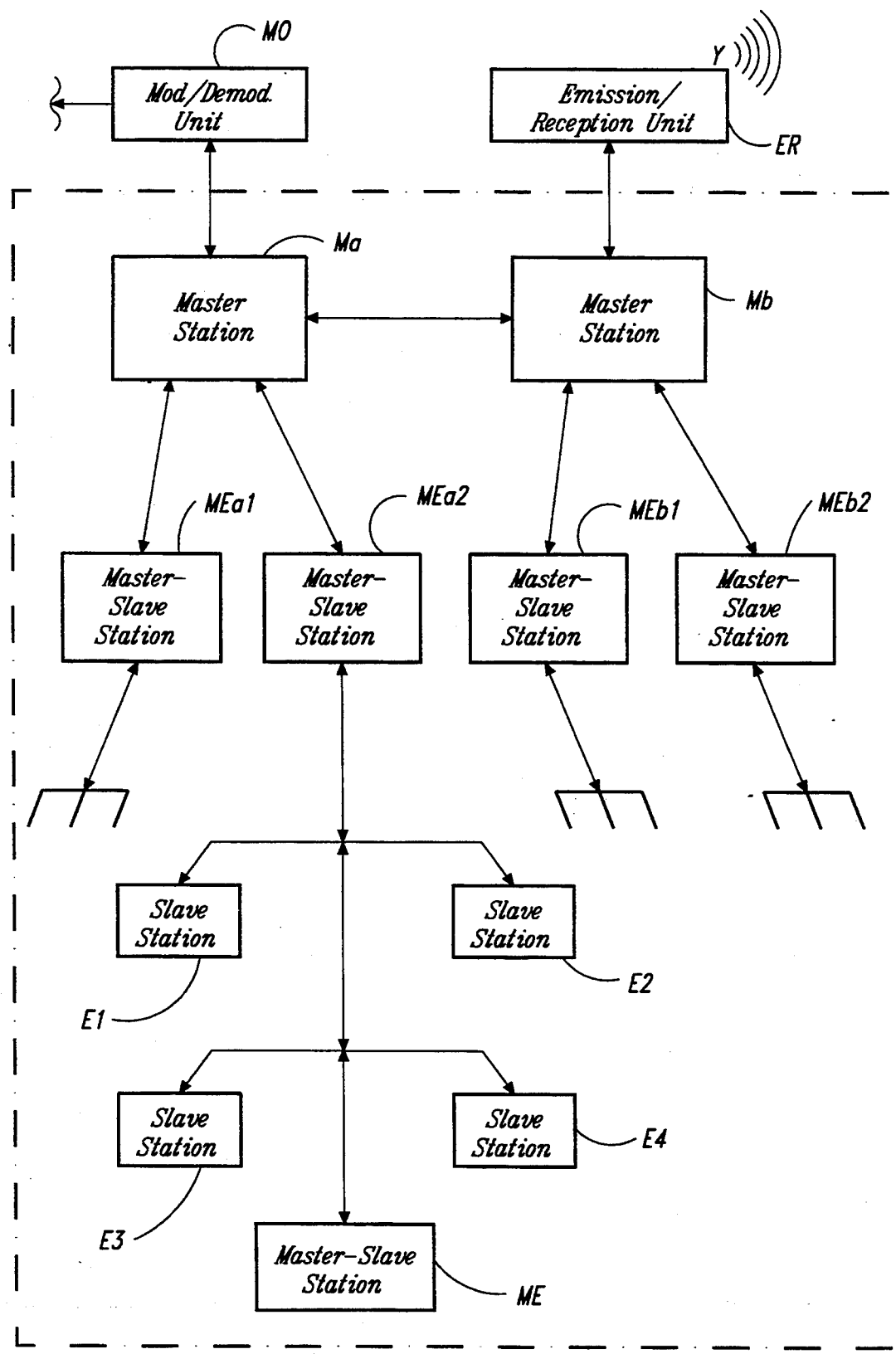
Figure 3:
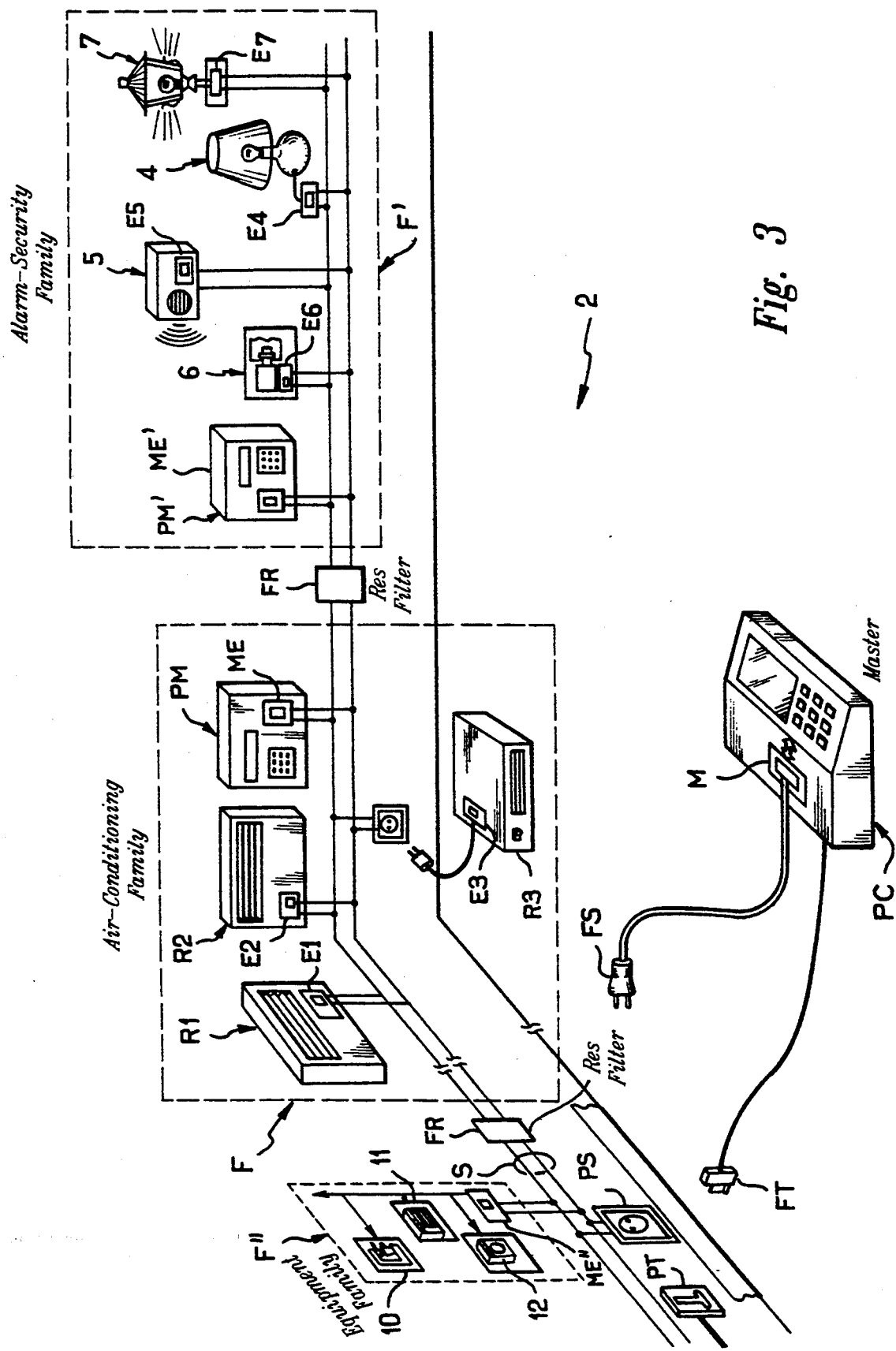
Figure 4:
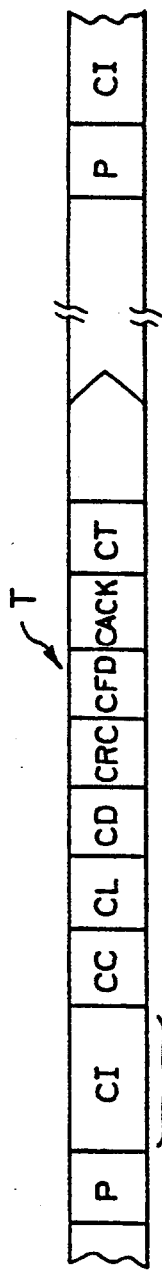
Figure 6:
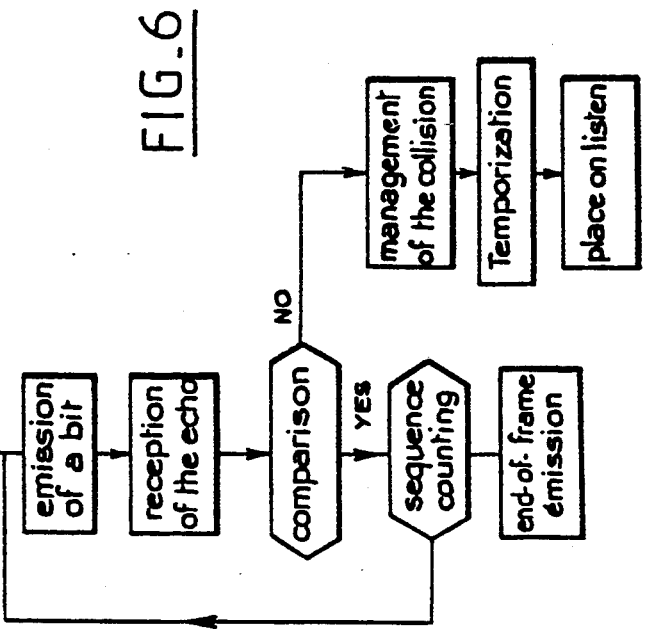
Figure 5:
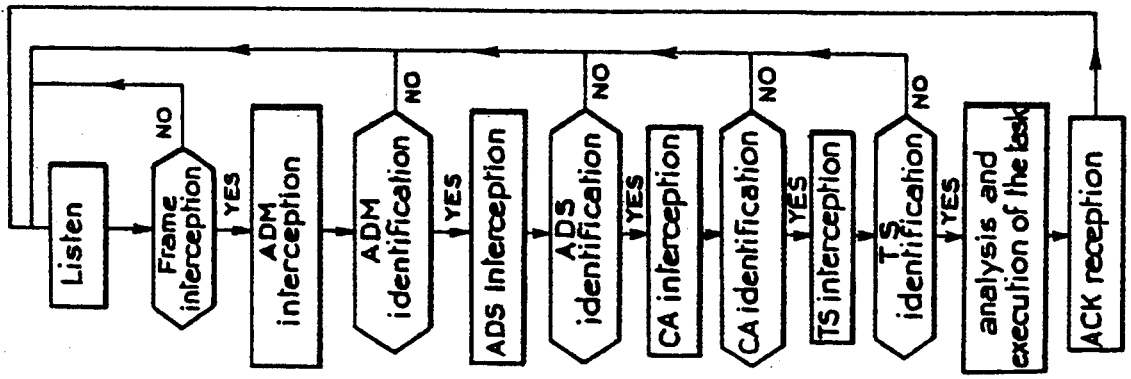

Other features and advantages of the invention will emerge further in the description hereafter. In the attached drawings given by way of non-limiting examples:

FIG. 1 is a simplified diagram of a communication system according to the invention, FIG. 2 is a block diagram illustrating the hierarchial structure of the communication method according to the invention, FIG. 3 is a view illustrating examples of equipment which can be controlled by a communication system according to the invention, FIG. 4 illustrates the structure of a frame generated with the method according to the invention, FIG. 5 is a flowchart of a listening sequence employed in the method according to the invention, FIG. 6 is a flowchart of an elementary emission sequence employed in the method according to the invention.

A preferred embodiment of the communication system according to the invention will now be described at the same time as the method employed in this system, with reference to FIGS. 1 to 6.

A home communication system 1 according to the invention is illustrated by the block diagram of FIG. 1 in terms of functional modules.

A Master station M, Master-Slave stations ME1 and ME2 and Slave stations E1, E2 are all connected to the mains 5 of a dwelling, this mains 5 comprising two lines constituting a single-phase (phase-neutral) or three-phase (phase-phase) installation.

The Master station M comprises a protocol monitoring module CP, a microprocessor module MP, a line control circuit DL and a power control circuit DP, as well as a modulator-demodulator circuit MO permitting the communication of the information between the Master station M and a telephone network R and connected to a telephone TE.

The Master station M is connected to a control member OC via the microprocessor MP. The control member OC can represent any kind of domestic device, an airconditioning system or even a remote alarm system for example.

The circuits for line control DL and for power control DP are connected directly up to the mains S, the first according to a bidirectional mode and the second in monodirectional mode permitting energy to be tapped from the mains S.

The line control circuit DL is dedicated to the transmission of information to the mains S whereas the power control circuit DP is dedicated to the monitoring of the energy tapped from the mains S and to the supplying of the Master station M.

Each line control circuit DL is equipped with rejection and resonance filters which effect a perfect isolation between groups of equipment. The resonance circuits promote the recovery of information within each group. They are produced in accordance with transmission techniques well known in particular in the railway sector.

Furthermore, rejection and resonance filters FR are placed at appropriate points of the electrical distribution circuit S so as to effect an isolation between groups of equipment F, F', with reference to FIG. 3, and to permit in particular the coexistence of several modes of transmission on the network, for example modulations of type ASK or FSK.

By way of example, for a single-phase distribution circuit, filters can be placed either between the phase and the neutral, or between the two phases.

The Master-Slave station ME1 also comprises a protocol monitoring module CP, a microprocessor or microcontroller module $\mu P$, circuits for power control DP and for line control DL which are each connected on the one hand to the mains S and on the other hand, respectively to the microprocessor module $\mu P$ and to the protocol monitoring module CP which can be furnished with an oscillator OS.

The power control circuit effects the monitoring of the electrical energy delivered to a control member OC3 which can be for example an actuator or arbitrary item of domestic equipment. It receives information emitted on the mains S by the Master station M.

In another Master-Slave station ME2 embodiment, the protocol monitoring and microprocessor modules are grouped together within a single integrated circuit CI and monitor the supply to a control member OC3 via the power control circuit DP.

It should be noted that the Master-Slave stations ME1, ME2 are configured to emit control information intended for Slave stations.

Each Slave station E1, E2 comprises a protocol monitoring circuit CL connected to the mains S via a line control circuit DL1, DL2, and a power switch TP connected on the one hand to the mains S and on the other hand to a control member OC1, OC2, and controlled by signals arising from the protocol monitoring circuit CL.

The Slave stations E1, E2 can only receive information travelling on the mains S and/or insert an item of return information into the received frame. By way of example, a Slave station controlling an electrical door catch will be able to inform the Master-Slave station upon which it is dependent, of the condition (open or closed) of this catch. This item of information emitted by the Slave station can constitute an item of information of recognition of its proper operating condition or of existence or even of execution of order.

The hierarchized structure 10 of the communication system according to the invention is represented in simplified manner in FIG. 2 in which are represented the communication possibilities between the various stations and the information exchanges between these stations, and not the hardware links which are not in any case direct inter-station, since the mains S constitutes the sole hardware medium for inter-station exchanged information.

By way of example, the structure represented comprises two Master stations Ma, Mb within a dwelling, one of the stations being connected to an external communication network via a modulation/demodulation unit MO and the other being in communication with external communication systems (not shown) via an emission/reception unit ER, for example of HF (high frequency) type.

The two Master stations Ma, Mb constitute the first layer of the system, the second layer being constituted by Master-Slave stations MEa1, MEa2 and MEb1, MEb2 which can communicate with one another, with the Master station Ma, Mb on which each is dependent, and with a set of Slave stations E1, E2, E3, E4 dependent on each Master-Slave station and which constitute the third layer of the system.

With each Master station Ma, Mb there is associated a set of Master-Slave stations MEa1, MEa2; MEb1, MEb2, each Master-Slave station able to control a set of Slave stations which can also be controlled by another Master-Slave station ME.

The bidirectional character of the communications, on the one hand between the Master stations and on the other hand, between the Master stations and the Master-Slave stations, and the intrinsically monodirectional nature of the communications between the Master-Slave stations and the Slave stations (in the emission of order direction solely) should be noted.

Furthermore, it will be possible without any problem to use the conventional modulation techniques by carrier currents, in particular modulations of FSK or ASK type.

Specifically, each station is materialized through a circuit whose structure and complexity depends on the nature of the station, and which is housed, either directly within items of equipment to be controlled, or within special programming modules or even in a base for monitoring the home communication system according to the invention.

Thus with reference to FIG. 3, the communication system 2 comprises a monitoring base PC incorporating a Master station M and connectable on the one hand to the mains S, for example the single-phase mains, via a standard plug FS and on the other hand to the telephone network via a telephone plug FT, the electrical FS and telephone FT plugs being intended to be plugged into sockets, electrical PS and telephone PT respectively, connected respectively to the electrical mains network S and to a telephone network (not shown).

In FIG. 3 are also represented a family F of items of equipment dedicated to the air-conditioning of the dwelling, a family F' of items of alarm and security equipment and a family F" of household electrical equipment comprising for example a microwave oven 11, a coffee maker 10 and a washing machine 12.

Each family of equipment F, F', F" comprises a Master-Slave station ME, ME' ME" which can be included within a monitoring and programming base M, M'.

Each air-conditioning element $R_1$, $R_2$, $R_3$ is connected to the mains S and includes a Slave station $E_1$, $E_2$, $E_3$ configured in the manner described in FIG. 1. By way of example, wall convectors $R_1$, $R_2$ and a movable item of heating equipment $R_3$ are represented.

The family F' of alarm equipment contains a monitoring and programming base M' including the Master-Slave station ME', a set of electrical locks or catches 6 including Slave stations $E_6$, a radar type detection device 5 including a Slave station $E_5$, lighting devices such as a bedside lamp 4 comprising in its socket a circuit constituting a Slave station $E_4$ and an outside light 3 also incorporating a Slave station $E_3$.

It should be noted that each family of equipment defining stations of Slave, Master-Slave or Slave type can have a speed of transmission which is individual to it, by virtue of the presence of resonance and rejection filters. By way of example, the transmission speeds can be chosen between 2400 Baud and 300 Baud. For this purpose, the protocol defines for each state of communication between stations of like or unlike type, transmission parameters, in particular a digital transmission speed, which are determined as a function of said stations.

The organization of the set of automated equipment of a dwelling into families or groups of equipment dedicated to a specific function permits better management of the home system equipping this dwelling. The communication of information and commands on the preexisting hardware medium constituted by the mains network, combined with the hierarchized organization which has just been described, leads to a powerful and easily expandable home communication system.

Moreover, the implementing of such a system offers the constructors of equipment intended to form part of a home installation the possibility of developing coherent ranges of products directly interfaceable with the mains.

Each transmitted frame comprises, with reference to FIG. 4, a preamble P, and the succession of fields mentioned below:
identification field CI
control field CC
data demarcation field CL
data field CD
coding field CRC
end-of-data field CFD
recognition field CACK
end-of-frame field CT.

The identification field CI itself comprises:
an address of the house ADM
an address of the station in the house ADS
an access code CA
a code representative of the type of station TS Within a home system employing the method according to the invention, such as that described in FIGS. 1 and and 3, each Master-Slave or Slave station is permanently in a state of listening on the mains, as illustrated in the flowchart of FIG. 5.

As soon as the existence of an overlaid frame is detected on the mains, an interception of the address field ADM is performed. If this address is precisely the address of the house in which the listening station is located, an interception of the station address field ADS is undertaken with the objective of detecting a command intended for the listening station. If this is the case, an interception of the access code CA is performed and makes it possible to safeguard the transmission of an order intended for an item of equipment. The following interception of the type of station is an additional identification procedure.

On termination of the processing of the identification field, analysis of the control field CC and of the data field CD leads to the execution of the task commanded. After reception of the recognition field CACK, the transmission of the frame is terminated.

In the method according to the invention, the stations of the systems which are designed to emit frames and more generally information on the mains, namely the Master stations and the Master-Slave stations, effect the emission of this information according to a procedure incorporating a collision detection, with reference to FIG. 6.

After a preliminary initialization step, each bit of the frame is emitted on the mains and its echo is received and then compared to the emitted bit until the whole of the frame has been emitted. When the number of sequences corresponding to the total number of bits of the frame has been counted, an end-of-frame emission step is undertaken. If the comparison reveals a difference between the emitted bit and the bit received as echo, then a step of management of the collision thus detected is undertaken. It leads to a placing on listen for a predetermined temporizing duration which permits the occupancy condition of the mains to be detected. When the line is again free, a new emission of the frame is undertaken.

The collision management employed in the communication method according to the invention forms the subject of a patent application filed jointly and simultaneously with the present application.

By way of exemplary home application of the method according to the invention, a daily programme containing the following sequences can be cited:
a) locking of the doors
b) surveillance of an alarm system
c) reduction in the heating power
d) reading the consumption of fuel-oil
e) reception of a telephone call
f) switching on of equipment.

The abovementioned sequences a, b, c and d are managed by specific Master-Slave stations. Reception and processing of telephone calls is performed by the Master station which is connected to a modem.

Each electrical lock constitutes a Slave station. The same is true for each sensor of the alarm system, for the various elements of the heating system and for all or some of the home equipment to be controlled.

Commands can of course be transmitted to the Master-Slave stations by infrared or microwave methods.

Naturally, the invention is not limited to the examples described and numerous developments can be made to these examples without exceeding the scope of the invention.

Thus, types of modulation other than present-day modulations by carrier currents of FSK or ASK type can be imagined, for example modulations of DPSK type.

It is thus possible to imagine application of the method according to the invention to the management of information intended for the customers of a commercial precinct, in particular for updating information in the departments of sales floors.

I claim:

1. A method for communicating information and commands within a dwelling or a property between several items of electrical equipment connected to a main electrical distribution circuit equipping the dwelling, comprising the steps of:
    establishing a hierarchized communication protocol based on selected transmission parameters, one of said transmission parameters for establishing the hierarchized communication protocol being digital transmission speeds of respective items of equipment defining communication stations of Master type dedicated to the emission of information, items of equipment of the Slave type dedicated to the reception of commands arising from one or more stations, and items of equipment defining communication stations of Master-Slave type dedicated to the reception of information arising from the stations of Master type and to the emission of information for controlling sets of equipment defining stations of the Slave type; and
    injecting onto the electrical distribution circuit with said items of equipment defining stations of the Master type and said items of equipment defining stations of the Master-Slave type, carrier currents conveying said information and commands according to said communication protocol, wherein the communication protocol defines, for communication between communication stations of the Master type and the Master-Slave type, and the Master-Slave type and the Slave type, respective transmission parameters, including digital transmission speed, as a function of said stations.

2. The method as claimed in claim 1 wherein the hierarchized communication protocol authorizes exchanges of information between at least one of said stations of Master type and an item of equipment outside said dwelling, via a communication support connected to communicate information between said at least one station of the Master type and said item of equipment outside said dwelling, wherein exchanges between said at least one station of the Master type and said item of equipment outside said dwelling are established according to an external communication protocol outside said dwelling, said external communication protocol including a transmission speed different from transmission speeds of communications within the dwelling.

3. The method as claimed in claim 2 wherein the information injected onto the electrical distribution circuit is in the form of a frame comprising a set of fields, each field including a coded sequence containing a predetermined number of bits, one of the said fields being an identification field including the following information:
    address of the dwelling to which the frame is directed;
    address of the station within the dwelling to which the frame is directed; and
    type of the station to which the frame is directed.

4. The method as claimed in claim 3 wherein the identification field furthermore includes an item of access code information.

5. The method as claimed in claim 4 wherein each station is placed in a listening state wherein the station performs a listening sequence for monitoring information circulating on the electrical distribution circuit, the listening sequence comprising the following steps:

testing frame interception by detecting a preamble;

in the event of detection of a preamble, interception of the address of the dwelling within the identification field to which the communication is directed;

in the event of identification of a communication actually addressed to an address of a dwelling of which the listening station forms part, interception of the address of the station to which the communication is directed;

in the event of identification of the station, interception of the station access code and identification of the station type;

analyzing a control field and a data field which are included in the frame to determine a task to be performed by the station; and after completion of the above steps, executing the task to be performed by the station.

6. The method as claimed in claim 3 wherein one of the stations of Master type or Master-Slave type emits information according to a bit-by-bit emission sequence comprising the following steps:

emission of a bit, after coding, modulation and injection onto the distribution circuit;

reception of an echo signal corresponding to the emitted bit;

processing of the echo signal, to deduce a received bit;

comparison of the emitted bit and of the received bit;

repeating in each case in the event of identity between the received bit and the emitted bit the steps of emitting, receiving, processing, and comparison for each following bit until emission of all of the bits in the frame;

in the event of divergence between the emitted bit and the received bit, detection of a collision between two items of information, followed by monitoring, with the emitting station, the electrical distribution circuit for a predetermined duration of temporization, to detect an absence of information conveyed on the electrical distribution circuit.

7. A system for communicating information and commands within a dwelling or a property between several items of electrical equipment connected to an electrical distribution circuit equipping said dwelling, by injecting onto said distribution circuit carrier currents conveying said information and commands, comprising:

within a first group of equipment, communication stations of Master type configured to generate and emit information and commands, the stations of the Master type being connected to emit the information and commands on the electrical distribution circuit;

within a second group of equipment, communication stations of Master-Slave type configured to receive and execute commands originating from stations of Master type, and to generate and emit on the electrical distribution circuit commands; and a third group of equipment including communication stations of Slave type each configured to receive and execute commands originating from stations of Master type or Master-Slave type, each station of the Slave type configured to produce information on its condition and connected to emit said information on its condition onto the electrical distribution circuit.

8. The system as claimed in claim 7 further including:

a modem connected to receive signals from one of the stations of the Master type; and a control member for performing operations under control of one of the stations of the Master type, the control member being connected to said one of the stations of the Master type, wherein each station of Master type comprises a monitoring and processing circuit and means for monitoring a communication protocol, each station of the Master type being connected to the electrical distribution circuit via a corresponding power control circuit for controlling a supply of power from the electrical distribution circuit to the station of the Master type and a corresponding line control circuit for controlling communication of information and commands between the Master station and the electrical distribution circuit, the monitoring and processing circuit further being connected to exchange information and commands with the control member and the protocol monitoring means being connected to communicate with a source outside of the dwelling or property via the modem.

9. The system as claimed in claim 7 wherein each station of Master-Slave type comprises a microcontroller and protocol monitoring means for monitoring information and commands on the electrical distribution circuit, each station of the Master-Slave type being connected to the electrical distribution circuit via a corresponding power control circuit and a line control circuit for controlling the communication of information and commands between the station of the Master-Slave type and the electrical distribution circuit, the power control circuit being connected to control an electrical supply from the electrical distribution circuit to one or more items of equipment directly monitored by the station of the Master-Slave type.

10. The system as claimed in claim 7 wherein each station of Slave type comprises:

protocol monitoring means for monitoring information and commands on the electrical distribution circuit connected to the electrical distribution circuit via a line control circuit for controlling reception of commands by the station of the Slave type from the electrical distribution circuit and emission of information by the station of the Slave type to the electrical distribution circuit; and a power control circuit controlled by the protocol monitoring means for controlling a electrical supply from the electrical distribution circuit to items of equipment associated with said station of Slave type.

11. The system as claimed in claim 9 wherein in at least one of the stations of Master-Slave type, the monitoring and processing circuit and the means for protocol monitoring are electronic circuits grouped together within a single integrated circuit.

12. The system as claimed in claim 8 wherein in at least one of the stations of the Slave type, the monitoring and processing circuit and power control circuit are within a single power and signal integrated circuit.

13. The system as claimed in claim 8 further including a plurality of rejection and resonance filters located at predetermined points on the electrical distribution circuit for isolating groups of equipment within said system.

* * * * *